(12) United States Patent
Jin (10) Patent No.: US 10,867,296 B2
(45) Date of Patent: Dec. 15, 2020

(54) METHOD, APPARATUS AND SYSTEM FOR PROCESSING DATA

(71) Applicant: Tencent Technology (Shenzhen) Company Limited, Guangdong (CN)

(72) Inventor: Chaolin Jin, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 360 days.

(21) Appl. No.: 15/836,977

(22) Filed: Dec. 11, 2017

(65) Prior Publication Data

US 2018/0108004 A1 Apr. 19, 2018

Related U.S. Application Data

(63) Continuation of application No. PCT/CN2016/098399, filed on Sep. 8, 2016.

(30) Foreign Application Priority Data

Sep. 9, 2015 (CN) .......................... 2015 1 0570820

(51) Int. Cl.
*G06Q 20/02* (2012.01)
*G06Q 20/32* (2012.01)
(Continued)

(52) U.S. Cl.
CPC ......... *G06Q 20/3278* (2013.01); *G06Q 20/02* (2013.01); *G06Q 20/3223* (2013.01);
(Continued)

(58) Field of Classification Search
CPC ... G06Q 20/02; G06Q 20/3223; G06Q 20/382
(Continued)

(56) References Cited

U.S. PATENT DOCUMENTS

2009/0191811 A1* 7/2009 Griffin ................ G06Q 20/102
455/41.1
2009/0270174 A1* 10/2009 Kelly ................. G07F 17/3267
463/42
(Continued)

FOREIGN PATENT DOCUMENTS

| CN | 101933246 A | 12/2010 |
| CN | 102404025 A | 4/2012 |

(Continued)

OTHER PUBLICATIONS

English Translation of Chinese Office Action for App. No. 2015105708209 dated May 29, 2019.
(Continued)

*Primary Examiner* — Robert R Niquette
*Assistant Examiner* — Liz P Nguyen
(74) *Attorney, Agent, or Firm* — Harness, Dickey & Pierce, P.L.C.

(57) ABSTRACT

A first client obtains a transfer value, generates a value transfer code based on account information and the transfer value, and enables a near field communication channel to transmit the value transfer code to the second client. The second client obtains the value transfer code transmitted from the first client through the near field communication channel, verifies the value transfer code, and in response to the value transfer code passing the verification, transmits the value transfer code to the server and the server carries out the value transfer according to the value transfer code.

15 Claims, 5 Drawing Sheets

(51) Int. Cl.
  *H04W 4/00*   (2018.01)
  *G07F 17/42*  (2006.01)
  *G06Q 20/38*  (2012.01)
  *G06Q 20/40*  (2012.01)
  *H04L 29/06*  (2006.01)
  *H04W 4/80*   (2018.01)

(52) U.S. Cl.
  CPC ....... *G06Q 20/382* (2013.01); *G06Q 20/3823* (2013.01); *G06Q 20/38215* (2013.01); *G06Q 20/401* (2013.01); *G07F 17/42* (2013.01); *H04L 63/0428* (2013.01); *H04W 4/00* (2013.01); *H04W 4/80* (2018.02)

(58) Field of Classification Search
  USPC .......................................................... 705/39
  See application file for complete search history.

(56) References Cited

U.S. PATENT DOCUMENTS

2010/0078471 A1   4/2010   Lin et al.

2013/0006864 A1*  1/2013   Hogl ..................... G06Q 30/06
                                                        705/44

FOREIGN PATENT DOCUMENTS

| | | |
  |---|---|---|
  | CN | 103489098 A | 1/2014 |
  | CN | 103871168 A | 6/2014 |
  | CN | 104463575 A | 3/2015 |
  | CN | 104537533 A | 4/2015 |
  | CN | 104751323 A | 7/2015 |
  | CN | 104753894 A | 7/2015 |
  | CN | 104753907 A | 7/2015 |
  | CN | 104836776 A | 8/2015 |

OTHER PUBLICATIONS

International Search Report for Application No. PCT/CN2016/098399, dated Nov. 11, 2016.
  International Preliminary Report for Application No. PCT/CN2016/098399 dated Mar. 13, 2018.
  Chinese Office Action for App. No. CN2015105708209 dated Mar. 4, 2020, and its English translation thereof.

* cited by examiner

METHOD, APPARATUS AND SYSTEM FOR PROCESSING DATA

CROSS-REFERENCE TO RELATED APPLICATIONS

This application is a continuation of International Patent Application No. PCT/CN2016/098399 filed on Sep. 8, 2016. This application claims the benefit and priority of Chinese Patent Application No. 201510570820.9, filed on Sep. 9, 2015. The entire disclosures of each of the above applications are incorporated herein by reference.

FIELD

The present disclosure relates to mobile networks and to processing data in online payment systems.

BACKGROUND

This section provides background information related to the present disclosure which is not necessarily prior art.

With the advancements in communication technologies, such as Internet technologies, the availability of online payment has become more common as a means for payment. Recently, with the increase in the popularity and speed of intelligent mobile devices, online payment users have high expectations for the option of online payment.

SUMMARY

This section provides a general summary of the disclosure, and is not a comprehensive disclosure of its full scope or all of its features.

The various embodiments of the present disclosure provide a system for processing data, including a first client, a second client, and a server, in which the first client obtains a transfer value, generates a value transfer code based on account information and the transfer value, and enables a near field communication channel to transmit the value transfer code to the second client, in which the value transfer code is generated by containing information of value transfer in a corresponding field based on a value transfer code protocol, and the information of the value transfer includes account information and the transfer value; the second client obtains the value transfer code transmitted from the first client through the near field communication channel, verifies the value transfer code, and in response to the value transfer code passing the verification, determines whether there exists a network connection between the second client and the server, and in response to no network connection existing between the second client and the server, stores the value transfer code, and sends the value transfer code to the server after a network connection exists between the second client and the server; and the server carries out the value transfer according to the value transfer code.

The various embodiments of the present disclosure provide a method for processing data, including:

obtaining, by a first device including a memory storing instructions and a processor in communication with the memory, a transfer value;

generating, by the first device, a value transfer code based on account information and the transfer value, in which the value transfer code is generated by containing information of value transfer in a corresponding field based on a value transfer code protocol, and the information of the value transfer includes the account information and the transfer value; and enabling, by the first device, a near field communication channel to transmit the value transfer code to a second device.

The various embodiments of the present disclosure provide a method for processing data in a hardware environment including a first device, a second device, and a server, performed at the second device including memory storing instructions and a processor in communication with the memory, including:

establishing a near field communication channel of the second device with the first device;

performing a preliminary part of value transfer process between the second device and the first device in a scenario where no network connections are established between the second device and the server, including:

obtaining a value transfer code sent from the first device through the near field communication channel, in which the value transfer code is generated by containing information of value transfer in a corresponding field based on a value transfer code protocol, and the information of the value transfer comprises account information and a transfer value;

verifying the value transfer code;

in response to the verification of the value transfer code and simultaneously determining that the second device establish none of the network connections with the server, storing the value transfer code into an accumulative database of the second device to complete the preliminary part of the value transfer process;

in response to a detection of availability of a network connection between the second device and the server, collecting series of the value transfer codes stored in the accumulative database; and transmitting the series of the value transfer codes to the server to perform remainder of the value transfer process between the second device and the first device.

The various embodiments of the present disclosure provide an apparatus for processing data, implemented on a first device, the apparatus including a memory and a processor, the memory storing instructions, and the instructions, when executed by the processor, causing the processor to perform:

obtaining a transfer value;

generating a value transfer code based on account information and the transfer value, in which the value transfer code is generated by containing information of value transfer in a corresponding field based on a value transfer code protocol, and the information of the value transfer includes the account information and the transfer value; and enabling a near field communication channel to transmit the value transfer code to a second device.

The various embodiments of the present disclosure provide an apparatus for processing data, implemented on a second device, the apparatus including a memory and a processor, the memory storing instructions, and the instructions, when executed by the processor, causing the processor to perform:

establishing a near field communication channel of the second device with the first device;

performing a preliminary part of value transfer process between the second device and the first device in a scenario where no network connections are established between the second device and the server, including:

obtaining a value transfer code sent from the first device through the near field communication channel, in which the value transfer code is generated by containing information of value transfer in a corresponding field based on a value transfer code protocol, and the information of the value transfer comprises account information and a transfer value;

verifying the value transfer code;

in response to the verification of the value transfer code and simultaneously determining that the second device establish none of the network connections with the server, storing the value transfer code into an accumulative database of the second device to complete the preliminary part of the value transfer process;

in response to a detection of availability of a network connection between the second device and the server, collecting series of the value transfer codes stored in the accumulative database; and transmitting the series of the value transfer codes to the server to perform the remainder of the value transfer process between the second device and the first device.

The various embodiments of the present disclosure provide a non-transitory computer readable storage medium storing computer executable instructions, the computer executable instructions, when executed by one or more processors, causing the one or more processors to perform:

obtaining a transfer value;

generating a value transfer code based on account information and the transfer value, in which the value transfer code is generated by containing information of value transfer in a corresponding field based on a value transfer code protocol, and the information of the value transfer includes the account information and the transfer value; and enabling a near field communication channel to transmit the value transfer code to a second device.

The various embodiments of the present disclosure provide a non-transitory computer readable storage medium storing computer executable instructions, the computer executable instructions, when executed by one or more processors, causing the one or more processors to perform:

establishing a near field communication channel of the second device with the first device;

performing a preliminary part of value transfer process between the second device and the first device in a scenario where no network connections are established between the second device and the server, including:

obtaining a value transfer code sent from the first device through the near field communication channel, in which the value transfer code is generated by containing information of value transfer in a corresponding field based on a value transfer code protocol, and the information of the value transfer comprises account information and a transfer value;

verifying the value transfer code;

in response to the verification of the value transfer code and simultaneously determining that the second device establishes none of the network connections with the server, storing the value transfer code into an accumulative database of the second device to complete the preliminary part of the value transfer process;

in response to a detection of availability of a network connection between the second device and the server, collecting a series of the value transfer codes stored in the accumulative database; and transmitting the series of the value transfer codes to the server to perform the remainder of the value transfer process between the second device and the first device.

According to the method, apparatus and system for processing data, the first client generates a value transfer code by containing information of the value transfer in a corresponding field based on a value transfer code protocol, and enables a near field communication channel to transmit the value transfer code to the second client, so that the second client transmits the value transfer code to the server and, therefore, enables the user to use the near field communication channel to transmit the value transfer code in the case of without a bank card, and further carries out the value transfer in the case of without network coverage.

For the second client, when there does not exist a network connection with the server, it stores the value transfer code, and waits to transmit the value transfer code to the server until there exists a network connection, so as to realize value transfer even if the second client is not connected to the server.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The features and advantages of the present disclosure will be more readily understood with reference to the accompanying figures, and the accompanying figures are merely illustrative and should not be construed as limitations to the present disclosure.

Corresponding reference numerals indicate corresponding parts throughout the several views of the drawings.

DETAILED DESCRIPTION

Example embodiments will now be described more fully with reference to the accompanying drawings.

In traditional mobile payment technologies, generally, payment can only be carried out in an area with network coverage, and in the case of no network access, payment cannot be carried out. Online-based payment can lead to account information being read maliciously, which poses a security issue.

The various embodiments of the present disclosure provide a method, apparatus, and system for processing data, which can carry out payment without network coverage, and is secure. The present disclosure will be further illustrated in combination with the various embodiments and the accompanying figures.

Figure 1:
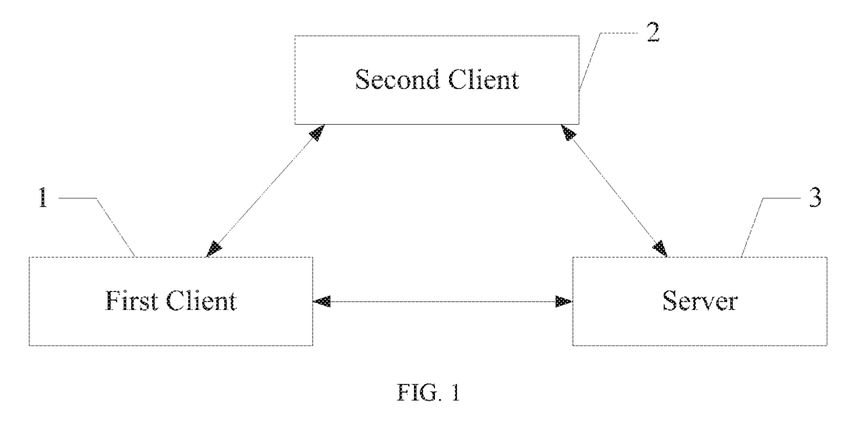
FIG. 1 is a block diagram of an application scenario of a method for processing data according to various embodiments of the present disclosure.

FIG. 1 shows an application configuration of a method for processing data according to various embodiments of the present disclosure. As shown in FIG. 1, a first client 1, such as a mobile phone, a tablet, or a PC, obtains a transfer value, and then sends a value transfer code which represents account information of the first client 1 and the transfer value to a second client 2 using a Near Field Communication (NFC) technique, and a server 3 carries out a value transfer between the first client 1 and the second client 2 according to the value transfer code. The first client 1, for example, is owned by a consumer or a user, and the second client 2, for example, is owned by a merchant. The NFC technique is a short-distance, high-frequency communication technique, and it allows electronic devices to perform contactless point-to-point data transmission by means of electromagnetic induction. The frequency of the NFC technique, for example, is 13.56 MHz and the rate of it is 106-424 kbit/s. When the electronic devices use the NFC technique to communicate with each other, a distance between them may be several centimeters, e.g., no more than 10 centimeters.

Figure 2:
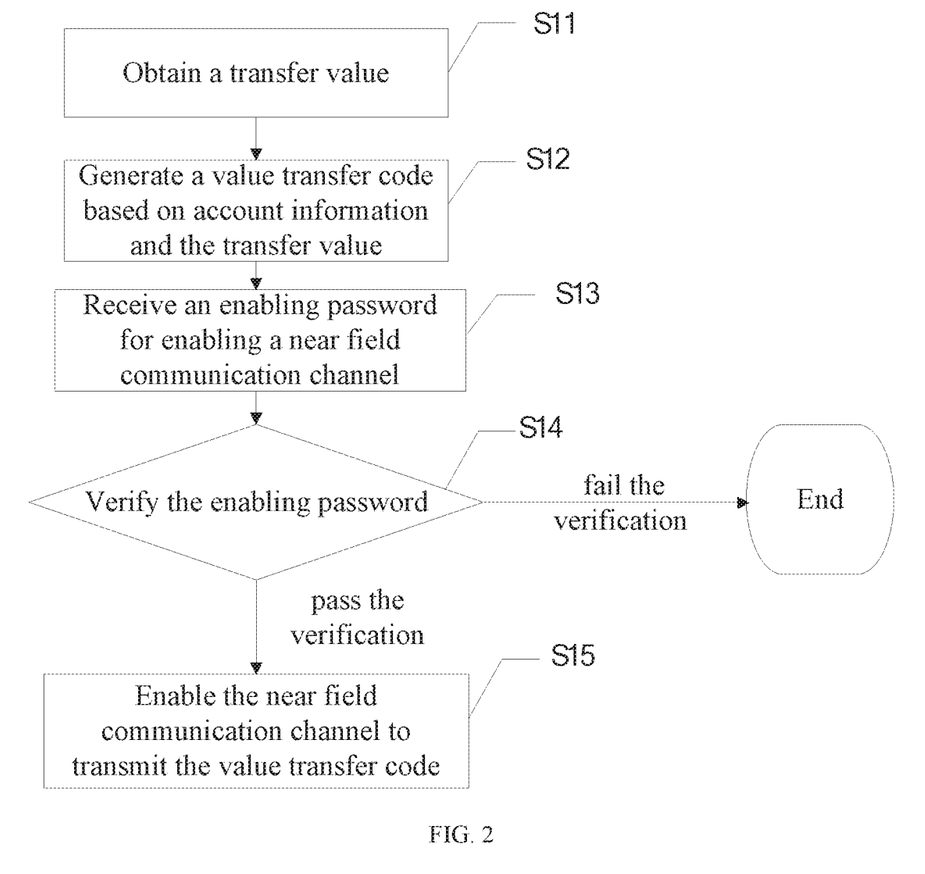
FIG. 2 is a flowchart of a method for processing data used on a first client according to various embodiments of the present disclosure.

FIG. 2 is a flowchart of a method for processing data according to various embodiments of the present disclosure, and the method applies to the first client 1 in FIG. 1. As shown in FIG. 2, the method for processing data according to the various embodiments of the present disclosure includes the following.

S11: A transfer value is obtained. In the various embodiments of the present disclosure, the transfer value may be directly entered into the first client 1 by a user using an I/O device (e.g., a keyboard or a touch screen). Or, the transfer value may be entered into the second client 2 by the merchant, and then the second client 2 transmits the transfer value to the first client 1 through the NFC. Alternately, the transfer value may be obtained by way of the merchant using a scanning device to scan an identification code, such as a barcode or a two-dimensional bar code, on an item to be bought by the user, and then transmitted to the first client 1 through the NFC by the second client 2.

S12: A value transfer code is generated based on account information and the transfer value.

In the various embodiments of the present disclosure, the value transfer code may contain information, such as account information and the transfer value of this value transfer, in a corresponding field based on a value transfer code protocol. The value transfer code may further contain a time stamp of the value transfer. The value transfer code protocol may be granted by the server 3, the second client 2, and the first client 1 in advance, and is randomly generated by the server 3, and then is sent to the second client 2 and the first client 1 for the first client 1 and the second client 2 to store in advance. The generated value transfer code is an encrypted value transfer code, and it may be encrypted statically or on-the-fly. In the following procedure of sending the value transfer code, a key may be sent to the second client 2 at the same time, for the second client 2 to decrypt the encrypted value transfer code. The key may be a negotiated key, and the first client 1 and the second client 2 may perform key synchronization using a state machine. In this case, it is not necessary to transmit a key. As an example, the value transfer code may be encrypted using an encryption algorithm with salt, such as a Message Digest algorithm 5 (MD5 algorithm). Since the MD5 algorithm is not reversible, through which the security of generating the value transfer code can be improved. According to various other embodiments, other encryption methods may be used to generate the value transfer code, e.g., using a hybrid encryption algorithm to generate an encrypted value transfer code.

S13: An enabling password for enabling a near field communication channel is received. In the various embodiment of the present disclosure, the first client 1 enables the near field communication channel after confirming the enabling password of the near field communication channel input by the user, and thus the security of the value transfer is improved. The enabling password may be received through an I/O device or a touch screen, or through a recognition device, such as a fingerprint reader or a camera.

S14: The enabling password is verified, and if the enabling password passes the verification, then S15 is executed. If the enabling password fails verification, then the operation is ended. However, in various other embodiments, if the enabling password fails the verification, information representing a password error may be output to prompt the user to input an enabling password again. In the various embodiments of the present disclosure, if the number of times that the enabling password fails the verification is more than a preset number, then the near field communication channel may be locked so as to prevent the near field communication channel from being enabled illegally.

S15: The near field communication channel is enabled to transmit the value transfer code to the second client 2, so that the second client 2 sends the value transfer code to the server 3, and the server completes the value transfer, i.e., transferring a corresponding value from an account associated with the first client 1 to an account associated with the second client 2.

Through the above procedures of S11, S12, and S15, the first client 1 may generate the value transfer code by including the information of this value transfer in the corresponding field according to the value transfer code protocol, and enable the near field communication channel to transmit the value transfer code to the second client 2, so that the second client 2 sends the value transfer code to the server, thereby enabling the user to use the near field communication channel to transmit the value transfer code to the second client 2 in the case of without a bank card, and thus to complete the data transfer in the case of without network coverage.

The above procedures of S13 and S14 are optional. Through the procedures of S13 and S14, the enabling password for enabling the near field communication channel is configured, and only when the enabling password of the near field communication channel passes the verification, the near field channel communication is enabled, which reduces the risk of malicious theft of the value transfer code, and improves the security of value transfer.

It should be noted that, in the various embodiments of the present disclosure, the first client 1 and the second client 2 have a near field communication function. When the first client 1 is in a network coverage area, after it sends the value transfer code to the second client 2 through the near field communication channel, it may receive checklist data. The checklist data is sent by the server 3. When the first client 1 receives the checklist data, it may present the checklist data to the user in a visualized manner such as by a table, a pattern, and/or texts. If there is no network access temporarily, the server 3 may wait to automatically synchronize the checklist data to the first client 1 until the first client 1 has network access.

Figure 3:
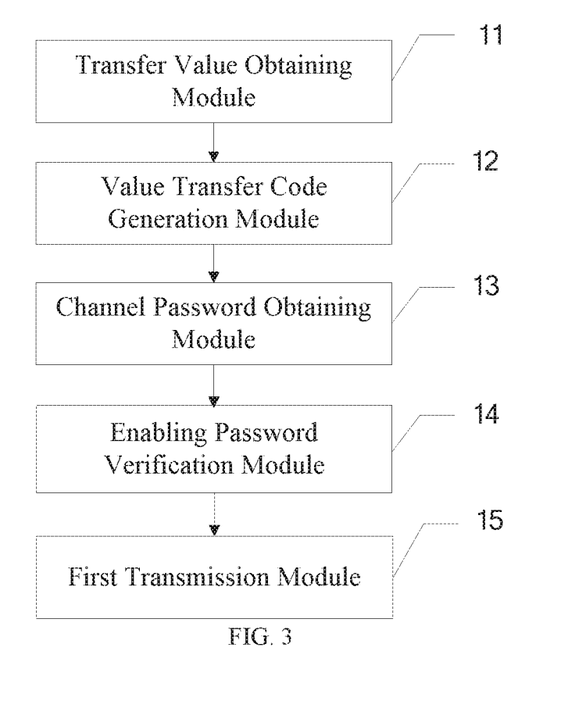
FIG. 3 is a block diagram of an apparatus for processing data used on the first client according to various embodiments of the present disclosure.

Corresponding to the method for processing data of FIG. 2, FIG. 3 depicts a block diagram of an apparatus for processing data according to various embodiments of the present disclosure, used on the first client 1 in FIG. 1. In FIG. 3, the apparatus for processing data includes a transfer value obtaining module 11, a value transfer code generation module 12, a channel password obtaining module 13, an enabling password verification module 14, and a first transmission module 15.

The transfer value obtaining module 11 is configured to obtain a transfer value. The value transfer code generation module 12 is configured to generate a value transfer code based on account information and the transfer value. The value transfer code may be generated by containing information of the value transfer in a corresponding field based on a value transfer code protocol, and the information of the value transfer includes the account information and the transfer value, and may further include a time stamp of the value transfer.

The channel password obtaining module 13 is configured to receive an enabling password for enabling a near field channel. The enabling password verification module 14 is configured to verify the enabling password, and if the enabling password passes the verification, the first transmission module 15 is activated. The first transmission module 15 is configured to enable the near field communication channel to transmit the value transfer code when the enabling password passes the verification in the enabling password verification module 14.

Through the transfer value obtaining module 11, the value transfer code generation module 12 and the first transmission module 15, the first client 1 may generate the value transfer code by including the information of the value transfer in a corresponding field according to the value transfer code protocol. The first client 1 enables the near field communication channel to transmit the value transfer code to the second client 2, so that the second client 2 sends the value transfer code to the server 3. This process enables the user to use the near field communication channel to transmit the value transfer code to the second client 2 in the case of without a bank card and, thus, to complete the data transfer in the case of no network coverage.

The channel password obtaining module 13 and the enabling password verification module 14 are optional. Through the channel password obtaining module 13 and the enabling password verification module 14, the enabling password for enabling the near field communication channel is configured, and only when the enabling password of the near field communication channel passes the verification, the near field channel communication is enabled, which reduces the risk of malicious theft of the value transfer code, and improves the security of value transfer.

The above value transfer code is an encrypted value transfer code to improve the security of the value transfer. The apparatus for processing data may further include a checklist data obtaining module to obtain checklist data and a data presentation module to present the checklist data to the user in a visualized manner.

Figure 4:
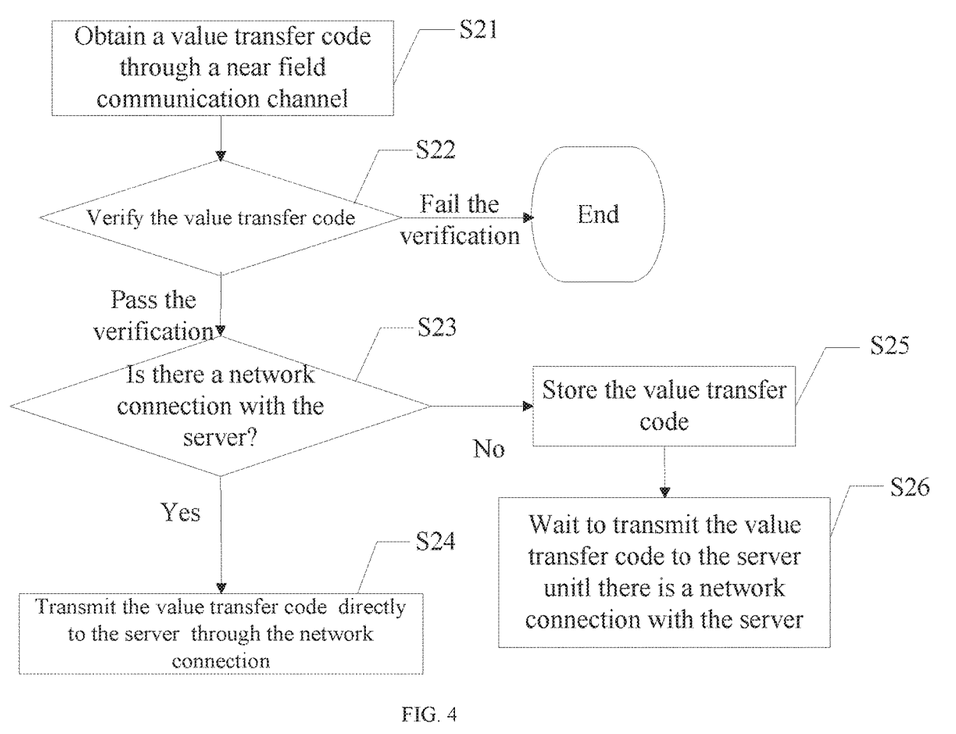
FIG. 4 is a flowchart of a method for processing data used on a second client according to various embodiments of the present disclosure.

FIG. 4 is a flowchart of a method for processing data according to various embodiments of the present disclosure. The method is used on the second client 2 in FIG. 1, and includes the following.

S21: A value transfer code sent by a first client 1 is obtained through a near field communication channel. Typically, the value transfer code is sent by the first client 1, and is generated by containing information of the value transfer in a corresponding field according to a value transfer code protocol, and the information of the value transfer includes account information and a transfer value, and may further include a time stamp of the value transfer.

S22: The value transfer code is verified, and if the value transfer code passes the verification, S23 is executed. If the value transfer code fails the verification, the value transfer operation is stopped, or the second client 2 waits for the first client 1 to re-generate a value transfer code to perform next verification. In various embodiments, since the value transfer code protocol is negotiated by the server 3, the second client 2, and the first client, and is stored on the second client 2 and on the first client 1 in advance, the second client 2 can verify whether the value transfer code it obtains is legal. The value transfer code passes the verification when the value transfer code received meets the data format of a value transfer code acceptable to the second client 2, and the value transfer code received is legal, and the data of the transferred value represented by the value transfer code matches a value that needs to be transferred to the second client 2.

S23: Whether there is a network connection with the server 3 is determined, and if it is determined that there is a network connection, the process proceeds to S24. If it is determined that there is no network connection, S25 and S26 are successively executed. In the various embodiments of the present disclosure, the network connection may be a wired connection or a wireless connection.

S24: The value transfer code is transmitted directly to the server 3 through the network connection, so as to complete the value transfer through the server 3.

S25: The value transfer code is stored.

S26: The second client 2 waits to establish a network connection with the server 3, and after the second client 2 establishes a network connection with the server 3, the second client 2 sends the value transfer code to the server 3, so as to complete the value transfer through the server 3, i.e., transferring a corresponding value from an account associated with the first client 1 to an account associated with the second client 2.

In the various embodiments of the present disclosure, the value transfer code obtained in S25 may be stored in a mobile storage device, and then the merchant may directly bring the mobile storage device to a financial institution such as a bank to complete the value transfer, which is considered to be equivalent to performing S25 and S26.

When the value transfer code transmitted from the first client 1 is an encrypted value transfer code, the value transfer code obtained in S21 is an encrypted value transfer code. After the second client 2 obtains the value transfer code through the near field communication channel sent from the first client 1, the second client 2 decrypts the encrypted value transfer code to obtain a decrypted value transfer code.

In the various embodiments of the present disclosure, after the value transfer code passes the verification, the following may be performed.

The second client outputs a triggering signal representing execution of a corresponding operation to an execution mechanism connected to the second client 2 in the signal aspect, or otherwise, returns failure information of the value transfer. In one example, the execution mechanism is, for example, a vending machine connected to the second client 2 in the signal aspect, and when the value transfer code obtained by the second client 2 passes the verification, then the second client outputs a triggering signal representing distributing a corresponding item to the vending machine. As another example, the execution mechanism may be an automatic ticket machine connected to the second client 2 in the signal aspect, and when the value transfer code obtained by the second client 2 passes the verification, the second client outputs a triggering signal representing printing a ticket to the automatic ticket machine. The execution mechanism and the second client 2 may be two separate devices, for example, the execution mechanism may be an automatic vending machine, and the second client 2 may be a dedicated client such as a POS machine, and the second client 2 may also be embedded in the execution mechanism, for example, the second client is embedded in a controller of the execution mechanism.

In the various embodiments of the present disclosure, before performing S21, the following may be performed. The second client 2 obtains a transfer value, and sends the transfer value to the first client 1. The transfer value is obtained, for example, by receiving a transfer value entered by a merchant using an I/O device (e.g., a keyboard, or a touch screen), or by the merchant using a scanning device to scan an identification code, such as a barcode or a two-dimensional code on an item bought by the user. The transfer value is transmitted to the first client 1 through the near field communication.

Figure 5:
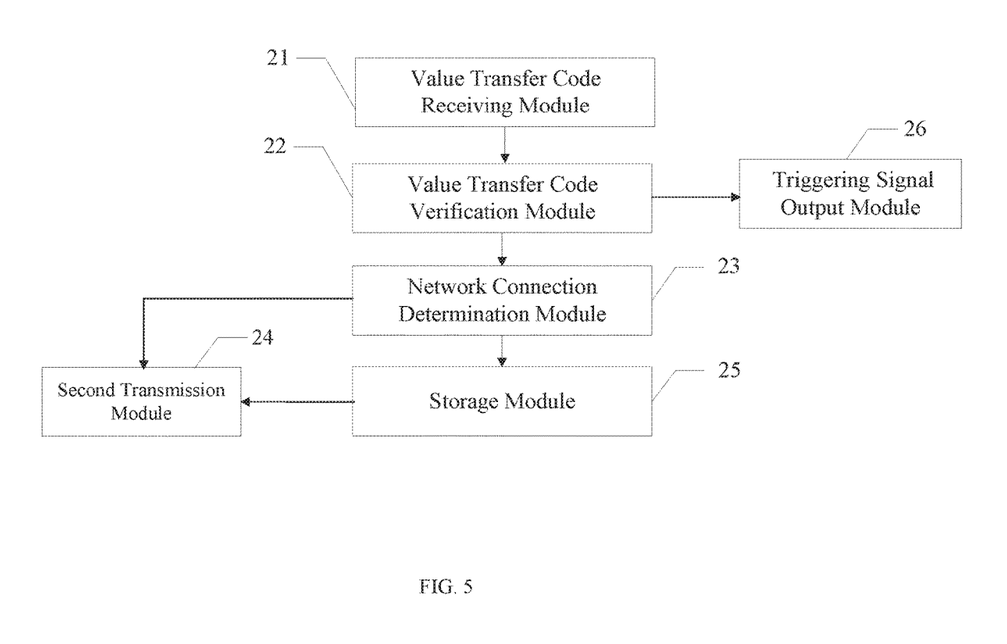
FIG. 5 is a block diagram of an apparatus for processing data used on the second client according to various embodiments of the present disclosure.

Corresponding to the method for processing data in FIG. 4, FIG. 5 is a block diagram for apparatus for processing data according to various embodiments of the present disclosure, implemented in the second client 2 in FIG. 1. In FIG. 5, the apparatus for processing data includes a value transfer code receiving module 21, a value transfer code verification module 22, a network connection determination module 23, a second transmission module 24, and a storage module 25.

The value transfer code receiving module 21 is configured to obtain a value transfer code sent by the first client 1 through a near field communication channel. The value transfer code is generated by including information of the value transfer in a corresponding field according to a value transfer code protocol. The information of the value transfer includes account information and a transfer value, and may further include a time stamp of the value transfer.

The value transfer code verification module 22 is configured to verify the value transfer code. The network connection determination module 23 is configured to determine whether there is a network connection with the server 3, when the value transfer code passes the verification. The second transmission module 24 is configured to directly transmit the value transfer code obtained to the server 3 through the network connection, so as to complete the value transfer through the server 3. A corresponding value from an account associated with the first client 1 is transferred to an account associated with the second client 2, when the network connection determination module 23 determines that the network connection exists.

The storage module 25 is configured to store the value transfer code when the network connection determination module 23 determines that there is no network connection. The second transmission module 24 is configured to send the value transfer code stored by the storage module 25 to the server 3 through a network connection, so as to complete the value transfer through the server 3. A corresponding value from an account associated with the first client 1 is transferred to an account associated with the second client 2, when the network connection determination module 23 determines that there is the network connection.

In the various embodiments of the present disclosure, the apparatus for processing data may further include a triggering signal output module 26. The triggering signal output module 26 is configured to output a triggering signal representing execution of a corresponding operation to an execution mechanism, after the value transfer code passes the verification. When the obtained value transfer code is an encrypted value transfer code, the apparatus for processing data may further include a decryption module, and the decryption module is configured to decrypt the encrypted value transfer code to obtain an decrypted value transfer code.

In the various embodiments of the present disclosure, the apparatus for processing data may further include a module to obtain the transfer value, and a module to send the transfer value to the first client 1.

According to the method and apparatus for processing data used on the second client 2, when there is no network connection between the second client 2 and the server 3, the second client 2 stores the obtained value transfer code. After there is a network connection between the second client 2 and the server 3, the second client 2 sends the value transfer code obtained to the server 3, so that even if the second client 2 and the server 3 are not connected through a network connection, the value transfer still can be carried out.

As shown in FIG. 1, the system for processing data according to various embodiments of the present disclosure includes the first client 1 (e.g., a user terminal), the second client 2 (e.g., a merchant terminal), and the server 3.

The first client 1 is configured to obtain a transfer value, generate a value transfer code based on account information and the transfer value, enable a near field communication channel to transmit the value transfer code to the second client 2. The value transfer code is generated by containing information of the value transfer in a corresponding field based on a value transfer code protocol. The information of the value transfer includes the account information and the transfer value, and may include a time stamp of the value transfer.

The second client 2 is configured to obtain the value transfer code sent by the first client 1 through the near field communication channel, verify the value transfer code, and after the value transfer code passes the verification, and determine whether there is a network connection between the second client 2 and the server 3. When there is no network connection between the second client 2 and the server 3, the value transfer code is stored and sent to the server 3 when there is a network connection between the second client 2 and the server 3. When there is a network connection between the second client 2 and the server 3, send the value transfer code to the server 3 directly through the network connection.

The server 3 is configured to complete the value transfer according to the value transfer code, i.e. transferring a corresponding value from an account associated with the first client 1 to an account associated with the second client 2.

The above value transfer code is an encrypted value transfer code, so as to improve the security of value transfer.

In various embodiments, the first client 1 may be further configured to receive an enabling password for enabling the near field communication channel, verify the enabling password. After enabling password passing the verification, the first client 1 enables the near field communication channel to transmit the value transfer code to the second client 2, which reduces the risk of malicious theft of the value transfer code, and improves the security of value transfer.

In various embodiments, the server 3 may be further configured to generate checklist data and send the checklist data to the first client 1 after the value transfer is completed.

Figure 6:
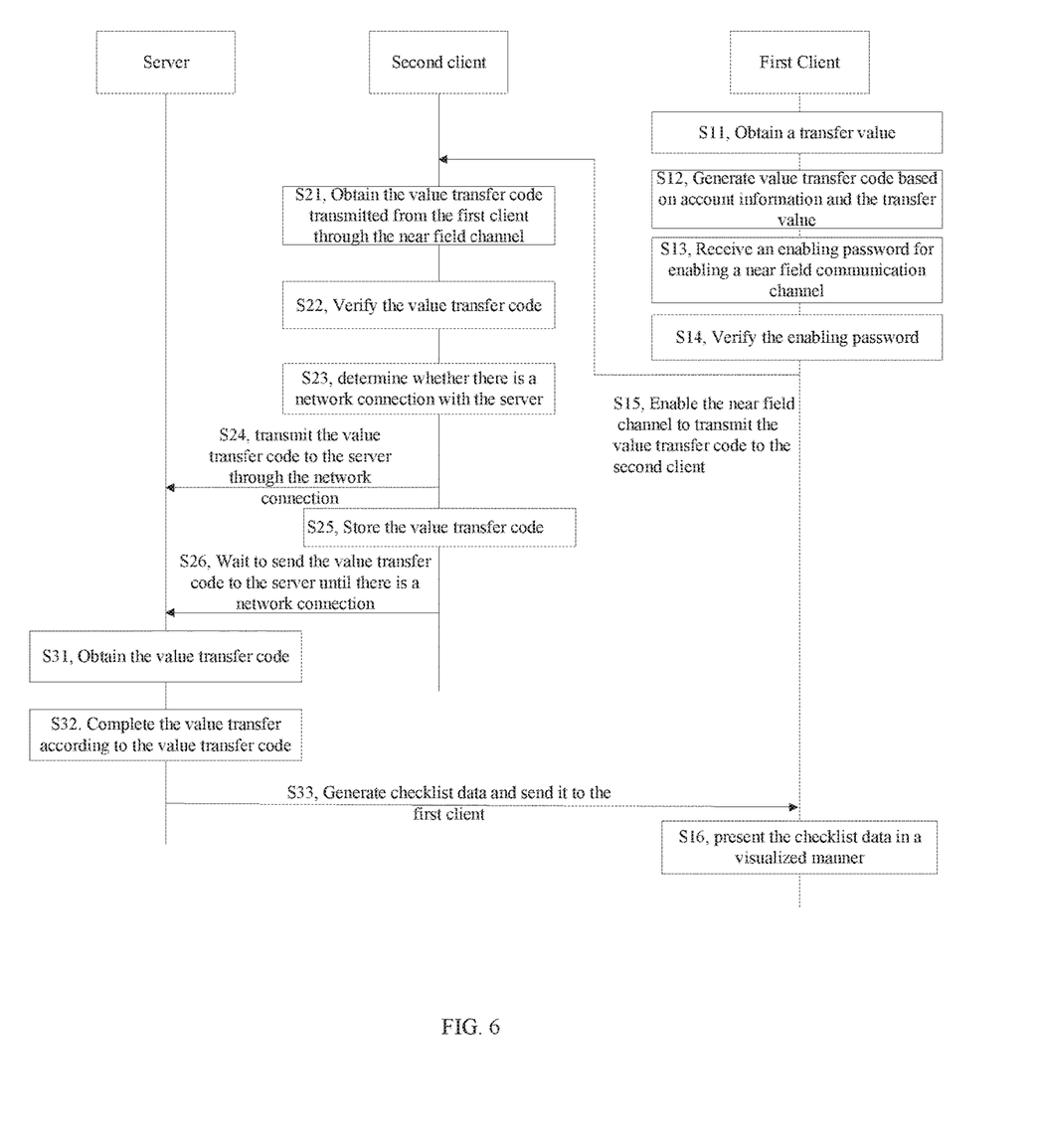
FIG. 6 is a diagram showing the time-sequence of a system for processing data according to various embodiments of the present disclosure.

The system for processing data according to the various embodiments of the present disclosure will be described in detail hereinafter with reference to FIG. 6. FIG. 6 is a diagram of time-sequence of a system for processing data according to various embodiments of the present disclosure. As shown in FIG. 6, the system for processing data includes the following.

S11: The first client 1 obtains a transfer value.

S12: The first client 1 generates a value transfer code based on account information and the transfer value.

S13: The first client 1 receives an enabling password for enabling a near field communication channel.

S14: The first client 1 verifies the enabling password. When the enabling password of the near field communication channel passes the verification, the first client 1 executes S15. When the enabling password of the near field communication channel fails to pass the verification, then the first client 1 stops the value transfer operation and may output information representing a password error to prompt the user to input an enabling password again. According to the various embodiments of the present disclosure, if the number of times when verification of enabling password fails is more than a preset number, then the first client 1 locks the near field communication channel so as to prevent the near field communication channel from being enabled illegally.

S15: The first client 1 enables the near field communication channel to transmit the value transfer code to the second client 2.

S21: The second client 2 obtains the value transfer code transmitted by the first client 1 through the near field communication channel.

S22: The second client 2 verifies the value transfer code, and when the value transfer code passes the verification, the second client 2 executes S23. When the value transfer code fails the verification, the second client 2 ends the value transfer, or the second client 2 waits for the first client 1 to regenerate a value transfer code to perform next verification.

S23: The second client 2 determines whether there is a network connection with the server 3. When there is no network connection, the second client 2 executes sS25 and S26 in sequence, and when there is a network connection, the process proceeds to S24.

S24: The second client 2 transmits the value transfer code directly to the server 3 through the network connection.

S25: The second client 2 stores the value transfer code.

S26: The second client 2 waits to establish a network connection with the server 3. After the second client 2 establishes a network connection with the server 3, then the second client 2 sends the value transfer code to the server 3.

S31: The server 3 obtains the value transfer code.

S32: The server 3 completes the value transfer according to the obtained value transfer code, i.e., transferring a corresponding value from an account associated with the first client 1 to an account associated with the second client 2.

S33: The server 3 generates checklist data and sends it to the first client 1 after the value transfer is completed.

S16: The first client 1, after receiving the checklist data, presents the checklist data to the user in a visualized manner, for example, through a form, pattern, and/or texts.

The system for processing data in the various embodiments of the present disclosure, according to the above-described S11, S12, S15, S21, S22, S31, and S32, uses the near field communication channel to transmit/receive the value transfer code generated by containing information of the value transfer in a corresponding field based on a value transfer code protocol, so as to complete the value transfer in the case of without network coverage.

Through the process of S23-S26, when there is no network connection between the second client 2 and the server 3, the second client 2 stores the obtained value transfer code. After the network connection recovers, the second client 2 sends the value transfer code to the server 3, so as to realize the value transfer even if the second client 2 does not have network access.

Through the optional process of S13 and S14, the first client 1 is configured with the enabling password for enabling the near field communication channel. Only when the enabling password of the near field communication channel passes the verification, the near field communication channel is enabled, which reduces the risk of malicious theft of the value transfer code, and improves the security of value transfer.

Through the optional process of S33 and S16, the user is able to monitor how the value transfer of his account is proceeding. If a value of the value transfer does not match, the user may feed the situation back to an institution concerned, so as to improve the security of value transfer.

As a detailed example, the method, apparatus and system for processing data according to the above embodiments may be applied in an online payment scenario. In the online payment scenario, the first client 1 may be a user terminal, and the user terminal is bound with at least one payment account. For example, the user may bind several bank card accounts (or may be other accounts that have the financial deposit and settlement functions as the bank cards, such as WeChat wallet, Yu'E Bao, and TenPay) often used through a particular application, or may only bind one bank card account. The application may be an existing application or an application that does not yet exist that has the payment function, or may be an application that is agreed by the bank, the merchant, and the user. In the various embodiments of the present disclosure, the first client 1 may be, for example, a smart phone, a PDA, a tablet computer, a notebook, or any other terminal capable of running the above application. The second client 2 may be a merchant terminal, such as a POS machine. The server 3 may be a trading terminal of a financial institution, such as a bank, and it is connected to a transaction system of the bank to exchange data with a database of the transaction system of the bank. The online payment method in the various embodiments of the present disclosure will be described in detail with reference to FIG. 6.

S11: A transfer value, i.e., a payment amount corresponding to an item to be purchased by the user, is obtained. The user may hold the first client 1 to trade with the merchant. When the user purchases the item, the payment amount may be directly entered into the first client 1 by the user, for example, via an I/O device (e.g., a keyboard or a touch screen), or may be entered into the second client 2 by the merchant, and the second client 2 transmits the payment amount to the first client 1 through the NFC. The payment amount may be obtained by way of the merchant using a scanning device to scan an identification code, such as a barcode or a two-dimensional bar code, on an item to be bought by the user, and then transmitted to the first client 1 through the NFC by the second client 2.

S12: A value transfer code, i.e., a payment transaction code, is generated based on account information and the transfer value. In the various embodiments of the present disclosure, the first client 1 may be bound to one or more bank card accounts/payment accounts. In the case where a plurality of bank card accounts/payment accounts are bound, the first client 1 may display information (for example, the banks, the account names, the available amounts, etc.) related to the plurality of bank card accounts/payment accounts bound to the user, and the user may select one of the plurality of bank card accounts/payment accounts to pay for the transaction. The user may also set a default bank card account/payment account to pay, and then the account information extracted is the information of the default bank card account/payment account. When the first client 1 is only bound with one payment account, the extracted account information is the information of the payment account bound. The payment transaction code is generated by containing information of the account information and payment amount of this transaction in a corresponding field based on a payment transaction code protocol, and may further contain a time stamp of the transaction. The payment transaction code protocol may be agreed by the transaction server 3, the second client 2, and the first client 1, and may be randomly generated by the server and sent to the second client 2 and the first client 1 to store in advance.

S13: An enabling password for enabling a near field communication channel is received.

S14: The enabling password is verified, and if the enabling password passes the verification, then S15 is executed. If the enabling password fails the verification, then the operation is ended.

S15: The near field communication channel is enabled to transmit the payment transaction code to the second client 2. For example, the user may put the mobile terminal with the NFC function near the merchant's POS machine, thus completing the transmission of the payment transaction code.

S21: The value transfer code sent by the first client 1 is obtained through the near field communication channel.

S22: The payment transaction code is verified, and if the payment transaction code passes the verification, then S23 is executed. If the payment transaction code fails the verification, then the transaction ends, or the second client 2 waits for the first client 1 to re-generate a payment transaction code to perform next verification.

S23: It is determined whether there is a network connection with the server 3. If it is determined that there is a network connection, the process proceeds to S24, and if it is determined there is no network connection, S25 and S26 are successively executed.

S24: The payment transaction code is transmitted directly to the server 3 through the network connection.

S25: The payment transaction code is stored.

S26: The second client 2 waits to establish a network connection with the server 3, and after the second client 2 establishes a network connection with the server 3, the second client 2 sends the payment transaction code to the server 3.

S31: The payment transaction code is obtained.

S32: The transaction is completed according to the obtained payment transaction code, i.e., transferring the corresponding amount from an account of the user to an account of the merchant, so as to complete the transaction.

S33: Checklist data is generated and sent to the first client 1.

S16: The checklist data is presented to the user in a visualized manner, so that the user has access to a bill.

The online payment method described in the above uses the near field communication channel to receive and transmit the payment transaction code generated by containing the information of the transaction in the corresponding field according to the payment transaction code protocol, so as to complete the transaction in the case of no network coverage. When the second client 2 does not have a network connection with the server 3, the second client 2 stores the obtained payment transaction code, and after the network connection is restored, the second client 2 sends the obtained payment transaction code the server 3 so as to complete the transaction even if the second client 2 does not have the network access.

By configuring the enabling password for enabling the near field communication channel on the first client, the near field communication channel can be enabled only when the enabling password of the near field communication channel passes the verification, which reduces the risk of malicious theft of the payment transaction code, and improves the security of the transaction.

After the transaction is completed, the bill may be presented to the user in a visualized manner, so that the user can know a deduction of the transaction, which improves the security of value transfer.

It will be understood by those skilled in the art that the various embodiments of the present disclosure may be provided as a method, system, or computer program product. Accordingly, the present disclosure may take the form of a complete hardware embodiment, a complete software embodiment, or a combination of software and hardware embodiment. Moreover, the present disclosure may take the form of a computer program product implemented on one or more computer usable storage media (including but not limited to magnetic disk storage, Compact Disc Read-Only Memory (CD-ROM), optical memory, etc.) in which the code of a computer usable program is included.

The present disclosure is described with reference to the flowcharts and/or block diagrams of the method, apparatus (system), and computer program product according to the embodiments of the present application, and it is understood that each flow and/or block in a flow chart and/or a block diagram and a combination of flows and/or blocks in the flow charts and/or block diagrams may be implemented by computer program instructions. These computer program instructions may be provided to a processor of a general purpose computer, a dedicated computer, an embedded processor, or other programmable data processing device to generate a machine such that an apparatus for implementing a specific function(s) in one or more flows in the flow charts and/or one or more blocks in the block diagrams by instructions executed by a processor of a computer or other programmable data processing devices.

These computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified by one or more flows in the flow charts and/or one or more blocks in the block diagrams.

Though the embodiments of the present disclosure are described in combination with the attached figures, it should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method for processing data in a hardware environment including a first device, a second device, and a server, performed at the second device including a memory storing instructions and a processor in communication with the memory, the method comprising:
    establishing, by the second device, a near field communication channel of the second device with the first device to perform contactless point-to-point data transmission between the first device and the second device by means of electromagnetic induction;
    performing, by the second device, a preliminary part of value transfer process between the second device and the first device in a scenario where no network connections are established between the second device and the server, including:
    obtaining, by the second device, a value transfer code from the first device through the near field communication channel, wherein the value transfer code is contains information of value transfer in a corresponding field of the value transfer code, the value transfer code is generated based on a value transfer code protocol granted by the second device and pre-stored on the second device, and the information of the value transfer comprises account information associated with the first device and a transfer value;
    verifying, by the second device, the value transfer code to determine whether the obtained value transfer code meets a data format of the value transfer code protocol pre-stored on the second device;
    in response to determining that the obtained value transfer code meets the data format of the value transfer code protocol and simultaneously determining that the second device establishes none of the network connections with the server, storing, by the second device, the value transfer code into an accumulative database of the second device to complete the preliminary part of the value transfer process, and outputting by the second device, a triggering signal that represents execution of a corresponding operation to an execution device which is connected to the second client in a signal aspect; and
    in response to a detection of availability of a network connection between the second device and the server, collecting, by the second device, series of the value transfer codes stored in the accumulative database, and
    transmitting, by the second device, the series of the value transfer codes collected to the server to perform remainder of the value transfer process between the second device and the first device, including transferring the transfer value obtained from the value transfer code from an account identified by the account information obtained from the value transfer code associated with the first device to an account associated with the second device.

2. The method of claim 1, wherein the method further comprises:
    in response to the detection of the availability of the network connection between the second device and the server, transmitting, by the second device, the value transfer code to the server through the network connection directly.

3. The method of claim 1, wherein the value transfer code is an encrypted value transfer code, and between obtaining a value transfer code transmitted from the first device through a near field communication channel and verifying the value transfer code, the method further comprises:
    decrypting, by the second device, the encrypted value transfer code.

4. An apparatus for processing data, implemented on a second device, the apparatus comprising: a memory and a processor, the memory storing instructions, and the instructions, when executed by the processor, causing the processor to perform:
    establishing a near field communication channel of the second device with a first device to perform contactless point-to-point data transmission between the first device and the second device by means of electromagnetic induction;
    performing a preliminary part of value transfer process between the second device and the first device in a scenario where no network connections are established between the second device and a server, including:
    obtaining a value transfer code sent from the first device through the near field communication channel, wherein the value transfer code contains information of value transfer in a corresponding field of the value transfer code, the value transfer code is generator based on a value transfer code protocol granted by the second device and pre-stored on the second device, and the information of the value transfer comprises account information associated with the first device and a transfer value;
    verifying the value transfer code to determine whether the obtained value transfer code meets a data format of the value transfer code protocol pre-stored on the second device;
    in response to determining that the obtained value transfer code meets the data format of the value transfer code protocol and simultaneously determining that the second device establishes none of the network connections with the server, storing the value transfer code into an accumulative database of the second device to complete the preliminary part of the value transfer process, and outputting by the second device, a triggering signal that represents execution of a corresponding operation to an execution device which is connected to the second client in a signal aspect; and
    in response to a detection of availability of a network connection between the second device and the server, collecting series of the value transfer codes stored in the accumulative database, and
    transmitting the series of the value transfer codes collected to the server to perform remainder of the value transfer process between the second device and the first device, including transferring the transfer value obtained from the value transfer code from an account identified by the account information obtained from the value transfer code associated with the first device to an account associated with the second device.

5. The apparatus of claim 4, wherein the instructions, when executed by the processor, further cause the processor to perform:
in response to the detection of the availability of the network connection between the second device and the server, transmitting the value transfer code to the server through the network connection directly.

6. The apparatus of claim 4, wherein the value transfer code is an encrypted value transfer code, and the instructions, when executed by the processor, further cause the processor to perform:
decrypting the encrypted value transfer code between the obtaining a value transfer code transmitted from the first device through a near field communication channel and the verifying the value transfer code.

7. A non-transitory computer readable storage medium storing computer executable instructions, the computer executable instructions, when executed by one or more processors, causing the one or more processors to perform:
establishing a near field communication channel of a second device with a first device to perform contactless point-to-point data transmission between the first device and the second device by means of electromagnetic induction;
performing a preliminary part of value transfer process between the second device and the first device in a scenario where no network connections are established between the second device and a server, including:
obtaining a value transfer code from the first device through the near field communication channel, wherein the value transfer code contains information of value transfer in a corresponding field of the value transfer code, the value transfer code is generated based on a value transfer code protocol granted by the second device and re-stored on the second device, and the information of the value transfer comprises account information associated with the first device and a transfer value;
verifying the value transfer code to determine whether the obtained value transfer code meets a data format of the value transfer code protocol pre-stored on the second device;
in response to determining that the obtained value transfer code meets the data format of the value transfer code protocol and simultaneously determining that the second device establishes none of the network connections with the server, storing the value transfer code into an accumulative database of the second device to complete the preliminary part of the value transfer process, and outputting by the second device, a triggering signal that represents execution of a corresponding operation to an execution device which is connected to the second client in a signal aspect; and
in response to a detection of availability of a network connection between the second device and the server, collecting series of the value transfer codes stored in the accumulative database, and
transmitting the series of the value transfer codes collected to the server to perform remainder of the value transfer process between the second device and the first device, including transferring the transfer value obtained from the value transfer code from an account identified by the account information obtained from the value transfer code associated with the first device to an account associated with the second device.

8. The non-transitory computer readable storage medium of claim 7, wherein the computer executable instructions, when executed by the one or more processors, further cause the one or more processors to perform:
in response to the detection of the availability of the network connection between the second device and the server, transmitting, by the second device, the value transfer code to the server through the network connection directly.

9. The non-transitory computer readable storage medium of claim 7, wherein the value transfer code is an encrypted value transfer code, and between obtaining a value transfer code transmitted from the first device through a near field communication channel and verifying the value transfer code, the computer executable instructions, when executed by the one or more processors, further cause the one or more processors to perform:
decrypting, by the second device, the encrypted value transfer code.

10. The method of claim 1, wherein the value transfer code protocol is granted by the server, the second client, and the first client in advance, and is randomly generated by the server, and then is sent to the second client and the first client for the first client and the second client to store in advance.

11. The method of claim 1, wherein the value transfer code further comprises a time stamp of the value transfer when the value transfer code is generated.

12. The method of claim 1, wherein the near field communication channel is encrypted.

13. The method of claim 1, wherein in response to the verification of the value transfer code being failed, ending the value transfer process.

14. The method of claim 1, wherein the execution device is a vending machine, and the triggering signal represents printing a ticket.

15. The method of claim 1, wherein the execution device is an automatic vending machine, and the triggering signal represents distributing a corresponding item.

* * * * *